UNITED STATES PATENT OFFICE.

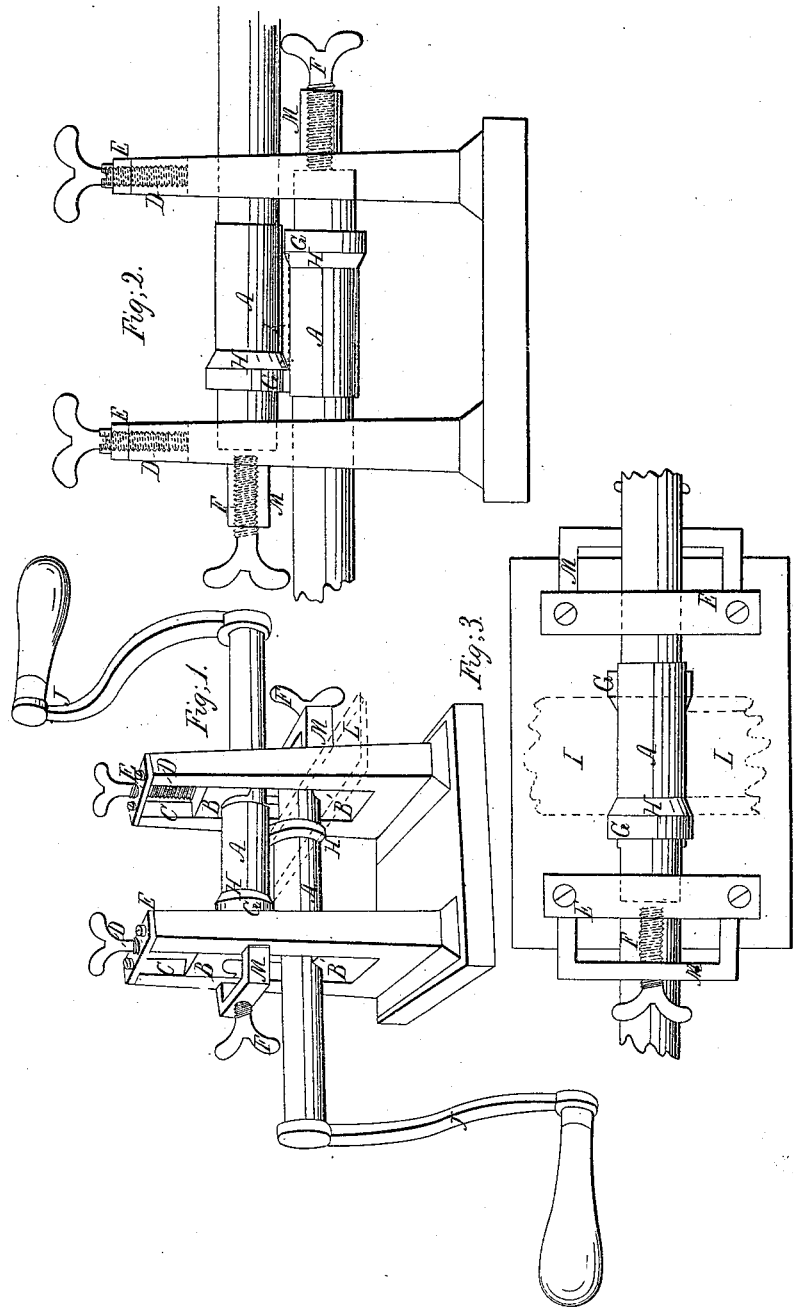

ROBERT KNIGHT, OF CLEVELAND, OHIO.

MACHINERY FOR BEVELING THE EDGES OF SKELPS OR METALLIC STRIPS, &c.

Specification of Letters Patent No. 9,274, dated September 21, 1852.

*To all whom it may concern:*

Be it known that I, ROBERT KNIGHT, of Cleveland, in the county of Cuyahoga and State of Ohio, have invented a new and Improved Machine for Beveling the Edges of Metallic Strips or Plates for Pipes and Flues; and I do hereby declare that the following is a full and exact description of the construction and operation of the same, reference being had to the annexed drawings, making part of this specification.

The nature of my invention consists in the arrangement of rollers in a frame work so as to receive a lateral movement or end play, one over the other, for the purpose of increasing or diminishing the distance between bosses on the rollers, according to the width of the strip or plate of which the flues and pipes are made.

Like letters refer to like parts in the different views.

The rollers A A, for beveling the edges of the strips or plates revolve in the boxes B B B' B', Figure 1. The lower boxes B' B' are stationary in the frame, but the upper boxes B B move vertically on the slides C C, which allows the rollers to be adjusted to the thickness of the strip by means of the set or thumb screws D D, which screw down on the boxes B B. The plates E E act as the nuts of the screws in adjusting the rollers to the plates or strips, as seen in Figs. 1 and 2. The rollers can also be adjusted to plates of various widths by the gage screws F F, which move the rollers longitudinally, thereby increasing or diminishing the length between the bosses G G on the rollers. The bevels H H on the bosses of the rollers incline inside, as seen in Figs. 1 and 2, and are of a proper angle to give the desired bevel to the edges of the plate or strip.

To bevel the plate, it is entered between the rollers, (the form of the plate before rolling is seen at I, Fig. 2,) then by turning the cranks J J, the plate is rolled through, thereby leaving the edges uniform and properly beveled for close lapping. The form of the bevel after having been rolled through is shown at L, Fig. 1.

The end braces M M are secured to the frame and act also as nuts for the screws F F, as seen in Figs. 2 and 3.

What I claim as my improvement and desire to secure by Letters Patent, is—

Arranging the rollers in the frame so as to receive a lateral movement as may be desired,—in other words, giving the rollers end play one over the other—as thereby increasing or diminishing the distance between the bosses (according to the width of the plate, or strip) and providing suitable means for retaining the same in place.

ROBERT KNIGHT.

Witnesses:
 JOHN BARR,
 W. H. BURRIDGE.